Figure 1:
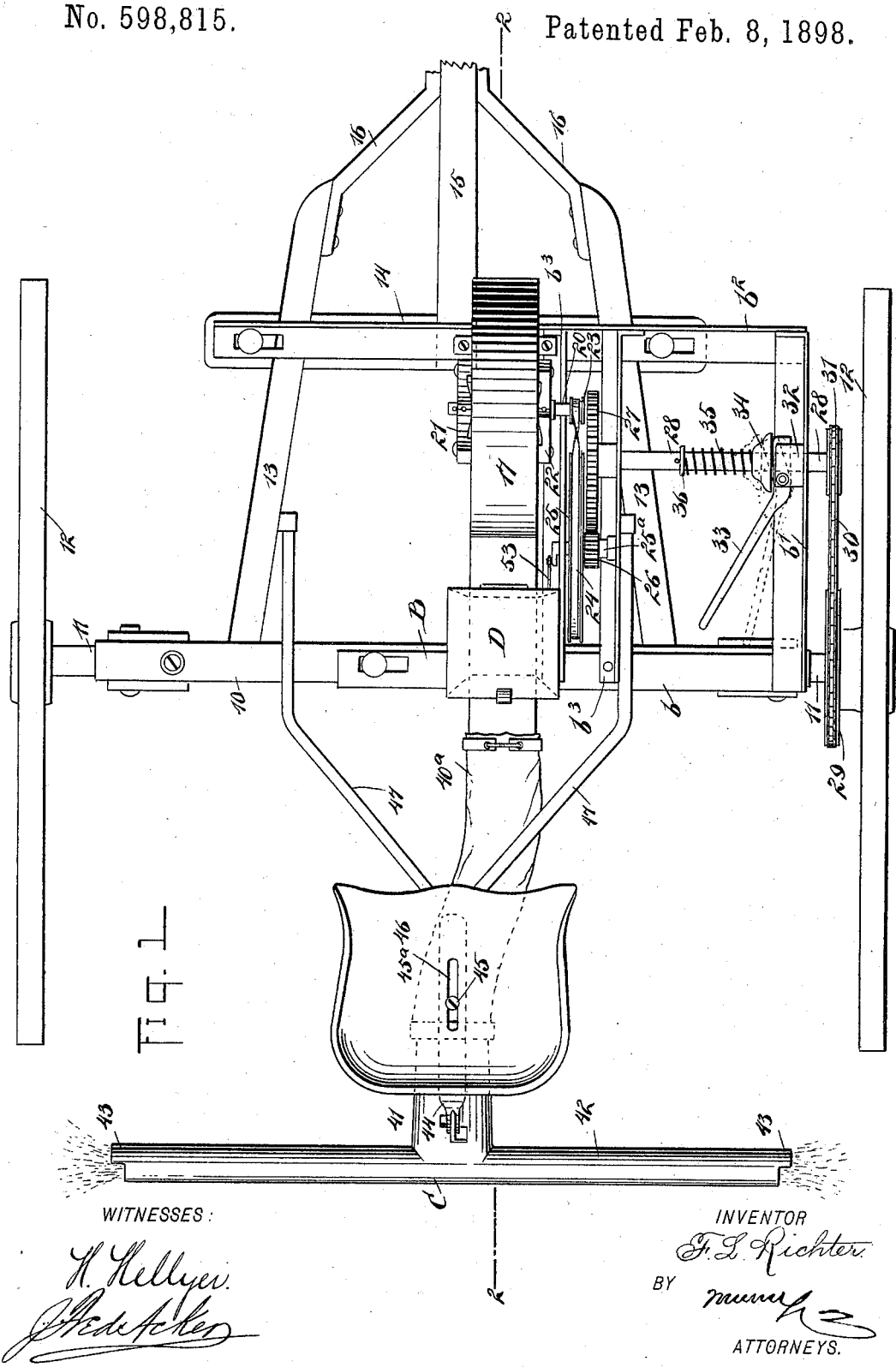

(No Model.)  2 Sheets—Sheet 1.

F. L. RICHTER.
POISON DISTRIBUTER.

No. 598,815.  Patented Feb. 8, 1898.

WITNESSES:
H. Hellyer.

INVENTOR
F. L. Richter.
BY
ATTORNEYS.

THE NORRIS PETERS CO., PHOTO-LITHO., WASHINGTON, D. C.

(No Model.) 2 Sheets—Sheet 2.
F. L. RICHTER.
POISON DISTRIBUTER.
No. 598,815. Patented Feb. 8, 1898.
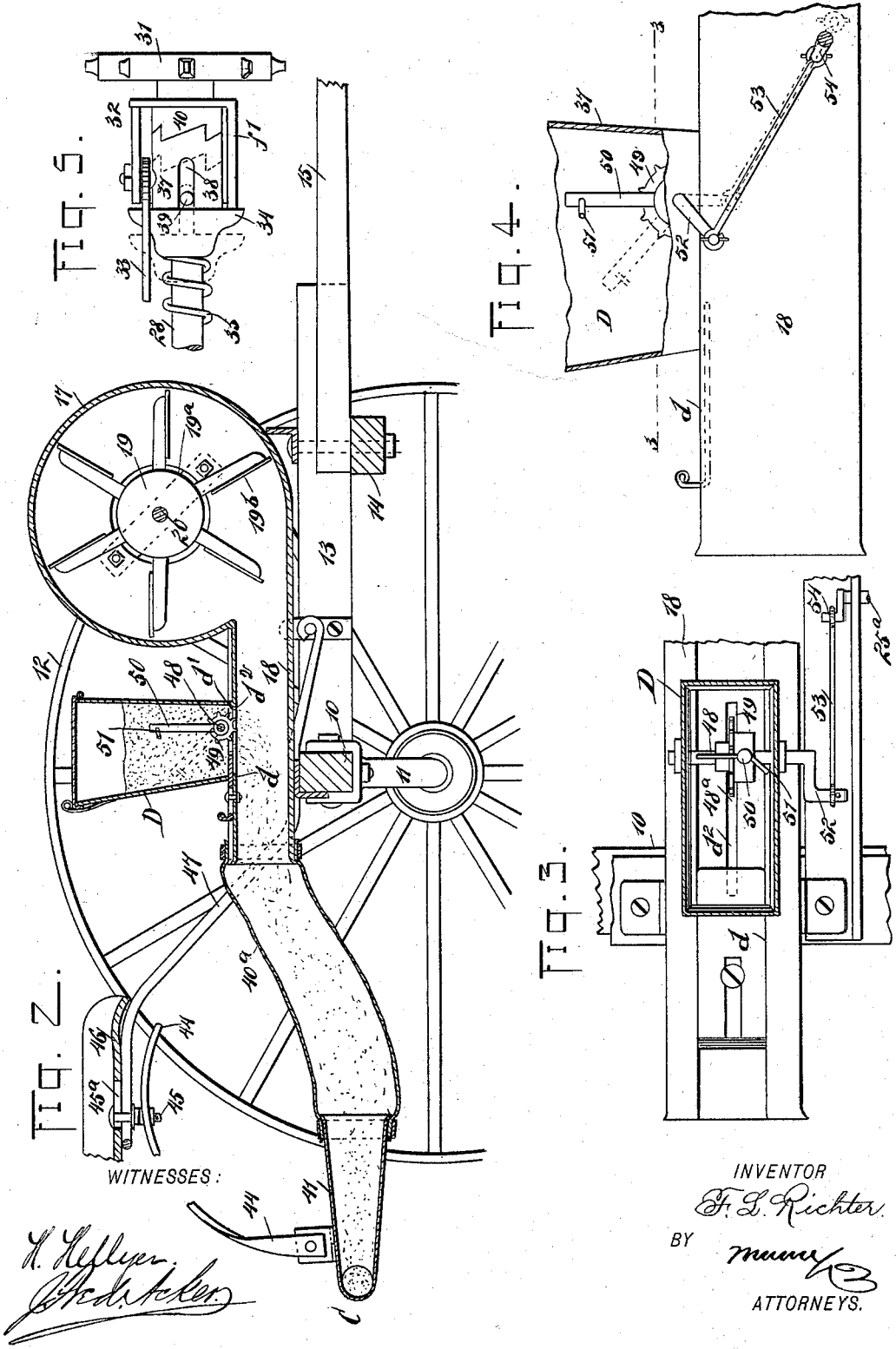
WITNESSES:
INVENTOR
F. L. Richter
BY
ATTORNEYS.
THE NORRIS PETERS CO., PHOTO-LITHO., WASHINGTON, D. C.

UNITED STATES PATENT OFFICE.

FRANK L. RICHTER, OF MORAVIA, TEXAS.

POISON-DISTRIBUTER.

SPECIFICATION forming part of Letters Patent No. 598,815, dated February 8, 1898.

Application filed May 20, 1897. Serial No. 637,424. (No model.)

*To all whom it may concern:*

Be it known that I, FRANK L. RICHTER, of Moravia, in the county of Lavaca and State of Texas, have invented a new and Improved Poison-Distributer, of which the following is a full, clear, and exact description.

The object of the invention is to provide a machine for distributing poison or a fertilizer to the plants at each side of the furrow through which the machine may be drawn.

Another object of the invention is to provide a machine of this character which will be exceedingly simple, durable, and economic in its construction.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a section on the line 2 2 of Fig. 1. Fig. 3 is a horizontal section on the line 3 3 of Fig. 4. Fig. 4 is a vertical section through a portion of the box in which the poison is carried, and Fig. 5 is a detail plan view of the shifting device for the driving mechanism of the machine.

An axle 10 is provided at each end with a crank-spindle 11, upon which spindle the supporting-wheels 12 of the device are mounted to revolve. Beams 13 are projected from the axle near its ends in a forwardly and inwardly direction, and the said beams are connected by braces 16 with a tongue 15, the braces 13 being attached to the front cross-bar 14.

A frame B, usually constructed principally of angle-iron, is located upon the frame above described, preferably in an adjustable manner, and the auxiliary or metal frame consists of a rear bar $b$, which extends across the axle 10, a side bar $b'$ at the right-hand side of the machine, and a front bar $b^2$, which extends over the main side beams of the machine-frame. The front and rear bars of the auxiliary frame at or near its center are connected by cross-bars $b^3$, as illustrated in Fig. 1.

At the front of the auxiliary frame a fan or blower casing 17 is located, being given the usual circular form, and from the said casing a chute 18, in the nature of a pipe, is rearwardly projected. The fan 19 is preferably constructed as shown in Fig. 2, in which it consists of a hub $19^a$, mounted on a shaft 20, and plates $19^b$, projected from the hub, each carrying a paddle or its equivalent. The shaft 20 is mounted to turn in brackets or boxes 21 and 22, secured to opposite sides of the fan-casing.

A small pulley 23 is secured upon one end of the shaft 20, the said pulley being connected by a belt 24 with a large wheel 25, secured upon a shaft $25^a$, which is preferably journaled in the cross-bars $b^3$ of the auxiliary frame. The shaft $25^a$ carries a pinion 26, and the said pinion meshes with a gear-wheel 27, which gear-wheel is secured upon the inner end of a shaft 28, which shaft extends across the auxiliary frame to the right-hand side of the machine. A sprocket-wheel 29 is secured to the hub of the right-hand supporting-wheel. The sprocket-wheel 29 is connected by a chain 30 with a sprocket-pinion 31, mounted loosely upon the outer end of the shaft 28.

From the right-hand beam $b'$ of the auxiliary frame a horizontal plate 32 is inwardly projected and upon the under side of this plate a lever 33 is fulcrumed. The body portion of the lever is parallel with the beam $b'$, while the handle portion is at an angle to this beam. The body portion of the lever is adapted, when the lever is operated in a given direction, to engage with a disk 34, splined on the shaft 28, and press the said disk inward against the tension of a spring 35, bearing against it, and a collar 36 on said shaft.

A clutch 37 is securely fastened to the outer face of the disk 34, the said disk being mounted to move freely on the shaft 28, but is provided with one or more slots 38, receiving pins 39, which are projected from said shaft 28, as shown in Fig. 2. The clutch 37 is engaged by a clutch-face 40, which is formed upon the hub of the sprocket-pinion 31, as is also shown in Fig. 5. By moving the lever 33 in one direction the two clutch-surfaces 37 and 40 will be carried out of engagement and the machine may be drawn forward without operating the fan; but when the lever 33 is in its normal position the fan will be operated whenever the machine is moved in a forward direction. Under any condition, however, when the machine is moved rearwardly the clutch-surfaces 37 and 40 will move one by the other without a driving engagement.

A box D, which is adapted to receive the pulverized poisonous material or other material to be distributed, is located on the top portion of the chute or branch pipe 18 from the fan, the said chute or branch pipe being provided with an opening $d^2$ in its top, and this opening may be opened or closed to a greater or less extent through the medium of a slide $d$, which is provided with a slot $d'$, adapted to register with the opening $d^2$.

A hose $40^a$ or its equivalent connects the chute 18 with the distributer C, the hose $40^a$ being directly connected with the shank 41 of the body 42 of the distributer, the latter extending at the back of the machine from side to side a suitable distance, the body 42 being in the nature of a tube the ends of which are open and provided at the front with an extension 43, as shown in Fig. 1. This distributer C is supported by means of a curved hanger-bar 44, pivoted to the distributer at its lower end and provided with a series of apertures through any one of which a bolt 45, provided with suitable lock-nuts, may enter, the said bolts being held to slide in a slot $45^a$ in the seat 46 of the machine, which is attached to the frame by means of arms 47. Thus it will be observed that the distributer C may be raised or lowered, as occasion may demand.

A shaft 48 is journaled in the receiving-box D, and said shaft 48 is provided with a spur-wheel 49, held to travel in the slot $d^2$ in the chute 18 of the fan, as shown in Fig. 3.

On the shaft 48, which is a rock-shaft, a post or a standard 50 is secured, which extends upward within the receptacle D and is provided with arms 51 at or near its upper end, and at one end of the shaft 48 a crank-arm 52 is formed, connected by a link 53 with a smaller crank-arm 54, formed upon the shaft $25^a$, carrying the pinion 26.

Thus in operation as the machine is advanced, the receptacle D being filled with material, the fan will cause the material dropped by the agitating device of the receptacle into the chute 18 to be driven into the distributing device C and delivered over the plants in proper manner.

This machine is exceedingly simple, it is durable and economic, and is particularly adapted for the purpose for which it is constructed.

Having thus described my invention, I claim as new and desire to secure by Letters Patent—

1. The combination, with a frame, a support for the frame, a fan, and a receptacle located upon the outlet portion of the fan, of a valve-controlled outlet for said receptacle, which outlet is in communication with the outlet for the fan, an adjusting distributing device, consisting of a substantially T-shaped tube having a flexible connection with the outlet of said fan, being open at the ends of its transverse section, and means for driving said fan, as and for the purpose specified.

2. The combination with a frame, a support for the frame, a fan located on said support, provided with an outlet, and a receptacle located upon the outlet of the fan, having an opening communicating with the outlet for the fan, of a substantially T-shaped distributer, a flexible connection between the shank of the T-shaped distributer and the outlet for the fan, the ends of the transverse or head member of the said distributer being open, a driving-shaft connected with said fan, means for driving said shaft, and a shifting mechanism whereby the rotation of the shaft may be controlled, for the purpose specified.

3. The combination, with a frame, supporting-wheels for the said frame, a blower carried by the frame, a receptacle the interior of which has a valved connection with the interior of the exit portion of the blower, a drive-shaft connected with said fan, a driving connection between said drive-shaft and one of the drive-wheels, and a shifting device whereby the drive-shaft may be taken out of driving connection with the drive or supporting wheel, of a crank-shaft journaled in the said receptacle, provided with a feed device and an agitating device, a driven shaft having a gear connection with the drive-shaft and provided with a crank-arm at one of its ends, and a link connection between said crank-arm and the crank-shaft in the receptacle, for the purpose set forth.

4. The combination with a frame, of a fan or blower mounted thereon, the casing of the fan or blower having a chute, a box mounted over the chute and communicating therewith at the bottom of the box, a rock-shaft mounted in the bottom of the box, an agitator-wheel carried on the shaft, a post fixed to the shaft and contained within the box, and means for rocking the shaft.

5. The combination with a frame, of a blower-casing mounted thereon, a fan mounted on a shaft and contained within the casing, a box mounted on the chute of the blower-casing and communicating therewith, means within the box for feeding material into the chute, a counter-shaft mounted in the frame, gearing connecting said counter-shaft with the shaft of the fan, a link connecting said counter-shaft with the feed devices of the box, a second counter-shaft geared with the first-named counter-shaft, a drive-shaft geared with the second-named counter-shaft, a clutch controlling the gearing between the second-named counter-shaft and the drive-shaft, and a distributer in connection with the chute.

FRANK L. RICHTER.

Witnesses:
ERNEST LAVEKK.
M. LORFINY.